(12) United States Patent
Ghanta et al.

(10) Patent No.: US 11,055,697 B2
(45) Date of Patent: Jul. 6, 2021

(54) ELECTRONIC CHIP FOR STORING PLURALITY OF LINKED ACCOUNTS

(71) Applicant: MasterCard International Incorporated, Purchase, NY (US)

(72) Inventors: Karabi Ghanta, Mumbai (IN); Siddesh Pangam, Pune (IN); Tushar Uddhav Gaikar, Mumbai (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 482 days.

(21) Appl. No.: 15/593,952

(22) Filed: May 12, 2017

(65) Prior Publication Data

US 2017/0357962 A1 Dec. 14, 2017

(30) Foreign Application Priority Data

Jun. 14, 2016 (SG) .......................... 102016043850P

(51) Int. Cl.
*G06Q 20/34* (2012.01)

(52) U.S. Cl.
CPC ....... *G06Q 20/341* (2013.01); *G06Q 20/3572* (2013.01)

(58) Field of Classification Search
CPC .......................... G06Q 20/341; G06Q 20/3572
See application file for complete search history.

(56) References Cited

U.S. PATENT DOCUMENTS

| | | | |
|---|---|---|---|
| 4,736,094 A | 4/1988 | Yoshida | |
| 5,859,419 A | 1/1999 | Wynn | |
| 7,594,611 B1 | 9/2009 | Arrington, III | |
| 7,814,014 B2* | 10/2010 | Gopalan | G06Q 30/06 705/41 |
| 9,092,767 B1* | 7/2015 | Andrews | G06Q 20/227 |
| 9,286,494 B1* | 3/2016 | Lamfalusi | G06K 13/0875 |
| 9,317,675 B2* | 4/2016 | Suwald | G06F 21/34 |
| 9,824,202 B2* | 11/2017 | Wegener | G06F 21/34 |
| 9,984,320 B2* | 5/2018 | Bae | G06K 19/0725 |
| 2005/0156026 A1* | 7/2005 | Ghosh | G06Q 20/045 235/380 |
| 2007/0228154 A1* | 10/2007 | Tran | G06K 7/0008 235/380 |
| 2013/0262291 A1* | 10/2013 | Ricci | G06Q 30/04 705/38 |

(Continued)

OTHER PUBLICATIONS

Profis, Sharon, CNET, Smart credit cards are coming. Here's what you need to know. May 25, 2015, accessed from https://www.cnet.com/how-to/smart-credit-cards-swyp-plastc-stratos-coin/ on Nov. 21, 2018. (Year: 2015).*

(Continued)

*Primary Examiner* — Elizabeth H Rosen
(74) *Attorney, Agent, or Firm* — Buckley, Maschoff & Talwalkar LLC

(57) ABSTRACT

According to a first aspect of the invention, there is provided a carrier comprising an electronic chip having stored thereon data identifying a plurality of accounts each linked to a respective issuer, wherein the electronic chip is configured to instruct a terminal reading the electronic chip to prompt for selection of one of the plurality of linked accounts before initiating a financial transaction.

16 Claims, 5 Drawing Sheets

(56) References Cited

U.S. PATENT DOCUMENTS

2017/0024743 A1* 1/2017 Fogel ................... H04L 63/083

OTHER PUBLICATIONS

Sposito, Sean. "Amex Builds E-Wallet for Non-Amex Spending," American Banker, (Mar. 28, 2011). (Year: 2011).*
"PCT Notification of Transmittal of the International Search Report and the Written Opinion", of the International Searching Authority, or The Declaration, dated Aug. 4, 2017 (dated Aug. 4, 2017), for International Application No. PCT/US2017/034116, 11pgs.
"EMV '96 Integrated Circuit Card Specification for Payment Systems", Internet Citation, Jun. 30, 1996 (Jun. 30, 1996), XP002363289, Retrieved from the Internet: URL:http://www.ttfin.net/techno/smartcards/cardspec.pfd. [retrieved on Dec. 29, 2005], (cover 1 + index i-xxvi + cover 1 + pp. I-1 to I-34, 62 total pages), (Part 1).
"EMV '96 Integrated Circuit Card Specification for Payment Systems", Internet Citation, Jun. 30, 1996 (Jun. 30, 1996), XP002363289, Retrieved from the Internet: URL:http://www.ttfin.net/techno/smartcards/cardspec.pfd. [retrieved on Dec. 29, 2005], (pp. I-35 to IV-2, 63 total pages), (Part 2).
"EMV '96 Integrated Circuit Card Specification for Payment Systems", Internet Citation, Jun. 30, 1996 (Jun. 30, 1996), XP002363289, Retrieved from the Internet: URL:http://www.ttfin.net/techno/smartcards/cardspec.pfd. [retrieved on Dec. 29, 2005], (pp. IV-3 to G-I, 62 total pages), (Part 3).

* cited by examiner

ELECTRONIC CHIP FOR STORING PLURALITY OF LINKED ACCOUNTS

CROSS-REFERENCE TO RELATED APPLICATION

This application is a U.S. National Stage filing under 35 U.S.C. § 119, based on and claiming benefit of and priority to SG Patent Application No. 10201604850P filed Jun. 14, 2016.

TECHNICAL FIELD

Various embodiments relate to a carrier having an electronic chip for storing a plurality of linked accounts and a terminal configured to read such an electronic chip.

BACKGROUND

Payment cards have payment chips to facilitate the performing of payments electronically. A customer may have one or more payment cards, such as, for example, one or more credit or debit cards. The customer may use one of the payment cards in conjunction with a merchant's device (e.g. an electronic point of sale (POS) terminal) to perform a payment with the merchant. For example, the customer may wish to purchase goods or services from the merchant, and so the customer may use the payment card to transfer funds into the merchant's account in exchange for receiving the goods or services from the merchant. The payment chip may be fitted with a near-field-communications (NFC) capability to enable contactless payments to be performed between the payment chip and a merchant's device.

A customer may have several of such payment cards, each issued from a same bank or from different banks, and it becomes inconvenient for him or her to carry all of them when he makes purchases. Accordingly, smart cards have been designed which seek to consolidate several payment cards into a single payment card.

However, several of such smart cards require a power source to function. The present disclosure provides an alternative smart card that is a passive device.

SUMMARY

According to a first aspect of the invention, there is provided a carrier comprising an electronic chip having stored thereon data identifying a plurality of accounts each linked to a respective issuer, wherein the electronic chip is configured to instruct a terminal reading the electronic chip to prompt for selection of one of the plurality of linked accounts before initiating a financial transaction.

According to a second aspect of the invention, there is provided a terminal for initiating a financial transaction involving an issuer account, the terminal comprising: an electronic chip sensor; at least one processor; and at least one memory including computer program code; the at least one memory and the computer program code configured to, with the at least one processor, cause the terminal at least to detect, using the electronic chip sensor, an electronic chip having stored thereon data identifying a plurality of accounts each linked to a respective issuer, the electronic chip being part of a carrier; and prompt, upon detection of the data identifying the plurality of linked accounts, for selection of one of the plurality of linked accounts before initiating the financial transaction.

According to a third aspect of the invention, there is provided a method for facilitating a financial transaction involving an issuer account, the method being performed at a terminal used for the financial transaction, the method comprising detecting for an electronic chip having stored thereon data identifying a plurality of accounts each linked to a respective issuer, and; prompting for selection of one of the plurality of linked accounts, in response to detecting the data identifying the plurality of linked accounts, before initiating the financial transaction.

According to a fourth aspect of the invention, there is provided a non-transitory computer readable medium having stored thereon executable instructions for controlling a terminal to perform steps comprising detecting for an electronic chip having stored thereon data identifying a plurality of accounts each linked to a respective issuer; and prompting for selection of one of the plurality of linked accounts, in response to detecting the data identifying the plurality of linked accounts, before initiating the financial transaction.

BRIEF DESCRIPTION OF THE DRAWINGS

Embodiments of the invention will now be better understood and readily apparent to one of ordinary skill in the art from the following written description, by way of example only, and in conjunction with the drawings, wherein like reference signs relate to like components, in which.

DETAILED DESCRIPTION

Various embodiments of the present invention relate to an electronic chip that is provided on a carrier.

The electronic chip may be a semiconductor chip. The electronic chip may include an integrated circuit having a set of electronic circuits on one small plate of semiconductor material, usually silicon. In use, the electronic chip may facilitate various financial operations, such as, for example, making a payment or receiving a payment. The payment may relate to a particular account administered by a particular issuer (e.g. financial institution or bank) and held by a particular customer (e.g. a person or a company). Accordingly, the customer may use the electronic chip to perform financial operations relating to their account. It is to be understood that in order to perform or receive payments the electronic chip may have to communicate with an external device, such as, for example, a merchant's electronic point of sale terminal.

It is to be understood that the issuer may be an entity (e.g. a financial institution or bank) which issues (i.e. provides or supplies) the carrier having the electronic chip. Additionally, the customer may be an entity (e.g. a person or company) which uses the electronic chip, for example, to make a payment into (i.e. credits) an account, or receive a payment from (i.e. debits) the account. The account is administered by the issuer of the electronic chip.

The electronic chip may be a radio-frequency identification (RFID) chip or a near-field-communications (NFC) chip, so that the electronic chip can be accessed via contactless technology. Accordingly, the electronic chip may be operable to communicate with an external device via NFC, such as, via the MasterCard™ PayPass™ protocol or via another contactless payment protocol as would be known to a person skilled in the art. Alternatively, the electronic chip may have one or more input and output terminals from which data is physically read.

Personalization may be part of the manufacturing process relating to the preparation of the electronic chip. Personalization transforms the electronic chip into a specific chip that can be used in one or more applications. In an example, personalizing the electronic chip ensures that it corresponds to a particular issuer and/or customer and/or function. Personalization may include storing software and data (e.g. customer data and/or issuer data) onto the electronic chip, then setting parameters of the electronic chip so that it may be used to perform or receive payments.

The electronic chip may be attached onto a portion of the carrier. The carrier may be made of material, such as metal or plastic (e.g. a plastic card, a token, a key-fob and the like). Cards of this form may be referred to as payment cards which include credit cards, debit cards or prepaid cards. Such cards may be used to purchase goods and/or services from a merchant, such as, for example, a shop or a business.

Figure 1:
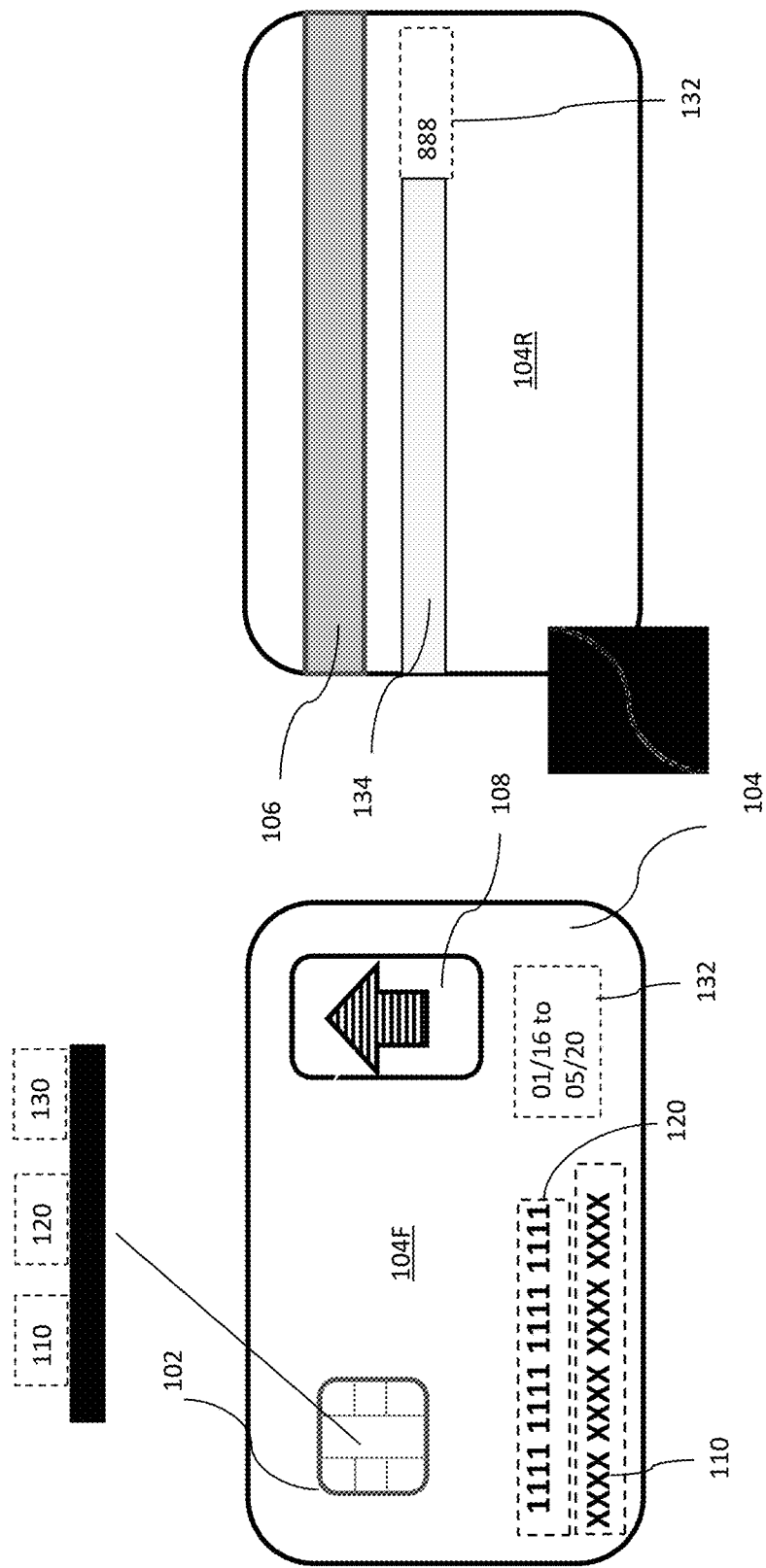
FIG. 1 shows a block diagram of a carrier having an electronic chip in accordance with an embodiment of the present invention.

FIG. 1 shows a front surface (104F) and a rear surface (104R) of a carrier 104 having an electronic chip 102 in accordance with an embodiment of the present invention.

The electronic chip 102 stores data identifying a plurality of accounts (110, 120, 130) each linked to a respective issuer. Linkage, in various embodiments of the present invention, refers to a designated account to which the card is allowed access. As mentioned above, the issuer may be a financial institution or a bank which administers accounts each held by a customer or account holder. Instead of having one carrier to hold an electronic chip to access its sole designated account, the electronic chip 102 supports multiple designations of different account numbers. Thus, the single electronic chip 102 can be used to access all the accounts stored therein. The electronic chip 102 is also configured to instruct a terminal (see reference numeral 306 shown in FIG. 3) reading the electronic chip 102 to prompt for selection of one of the plurality of linked accounts before initiating a financial transaction. The financial transaction is then performed against the selected one of the plurality of linked accounts, whereby the selected linked account may be credited when a deposit transaction is performed or debited when a purchase is made using the selected linked account.

"All-in-one" or "smart" credit cards, which combine several credit cards into a single credit card, exist. However, such cards reprogram the magnetic strip of the credit card with the data of the selected account, i.e. the electronic chip of the credit card is not used to store the data of a plurality of linked accounts nor is the electronic chip read when determining the account number against which a financial transaction is to be processed. Further, reprogramming of the magnetic strip requires for the "all-in-one" or "smart" credit card to have an induction coil to perform the reprogramming. This induction coil has to draw power from a source within the card, so that such a card requires an embedded power source to function. Advantageously, the electronic chip 102 of the present invention does not require such an embedded power source to function. The carrier 104 is thus a non-powered or passive device. Should power be required to access the electronic chip 102, such power is drawn from an external source, such as a payment terminal which reads the electronic chip 102. In addition, the electronic chip 10 also has improved security, improved storage capabilities and greater flexibility in data management.

The carrier 104 and its payment chip 102 are also physical items as opposed to digital wallet applications which can store multiple credit or debit account numbers. Providing a carrier 104 and payment chip 102 solution to store multiple account data is advantageous in regions where digital applications are not yet readily available or with customers who still prefer making cashless payments using traditional plastic.

The plurality of accounts may belong to the same issuer, for example, several different banking or credit card accounts with a particular bank. On the other hand, the plurality of accounts may belong to different issuers, whereby a number of the accounts may be with a first bank, while the remainder of the accounts with one or more different banks.

In the embodiment shown in FIG. 1, the carrier 104 is a piece or portion of plastic. The electronic chip 102 is of contact configuration and provided on the front surface 104F of the carrier 104. Although not shown, the electronic chip may alternatively be of contactless configuration, whereby the electronic chip is provided within the carrier 104, i.e. the electronic chip is covered by both the front surface 104F and the rear surface 104R of the carrier 104. Such a contactless configuration may also have a contact interface provide on either the front surface 104F, the rear surface 104R or both, so that the electronic chip can be accessed by contact reading. Accordingly, the electronic chip 102 may be at least one of a contact configuration whereby the electronic chip 102 is provided on a surface of the carrier 104; or a contactless configuration whereby the electronic chip is provided within the carrier 104. The contact configuration may be based on the ISO/IEC 7816 standard and the contactless configuration may be based on the ISO/IEC 14443 standard In both the contact and contactless configurations, the front surface 104F of the carrier 104 also has a marking 108, which may be for example: text, an image or both. This marking 108 may serve to identify the issuer of the carrier 104, whereby the marking 108 may then contain the name of the issuer, logos or slogans used by the issuer. In addition, the front surface 104F may also contain other information such as the validity period 132 of the carrier 104. The rear surface 104R of the carrier 104 also comprises a magnetic strip 106, the card verification value (CVV) 132 and a signature strip 134.

As mentioned above, the electronic chip 102 may comprise an integrated circuit. The integrated circuit may have a microprocessor, interfaces, RAM and storage. The microprocessor runs an operating system which having encryption and security features. Input of the correct passwords allows the operating system to be programmed with account data, which is undertaken during the personalization phase. In this manner, the integrated circuit may have the data identifying the plurality of linked accounts (110, 120, 130) embedded therein. The following sets out how this data may be organized in the electronic chip 102.

The circuitry of the electronic chip 102 may define the functionality (i.e. some or all functions) of the electronic chip 102 and provide the electronic chip 102 with the storage capability for the data identifying the plurality of linked accounts (110, 120, 130). The circuitry may support application programs or files having one or more parameters (i.e.

variables or attributes) which are configurable to define functions of the electronic chip. In an embodiment, the at least one configured function of the electronic chip 102 may enable the electronic chip to make a payment. Accordingly, this allows the carrier 104 to become a payment card being any one or more of a credit card, a debit card or a prepaid card.

The configuration of the parameters also allows further personalization of the electronic chip 102. For example, the parameters may be set to have the electronic chip 102 store the data identifying the plurality of linked accounts (110, 120, 130) into the electronic chip 102.

Figure 2:
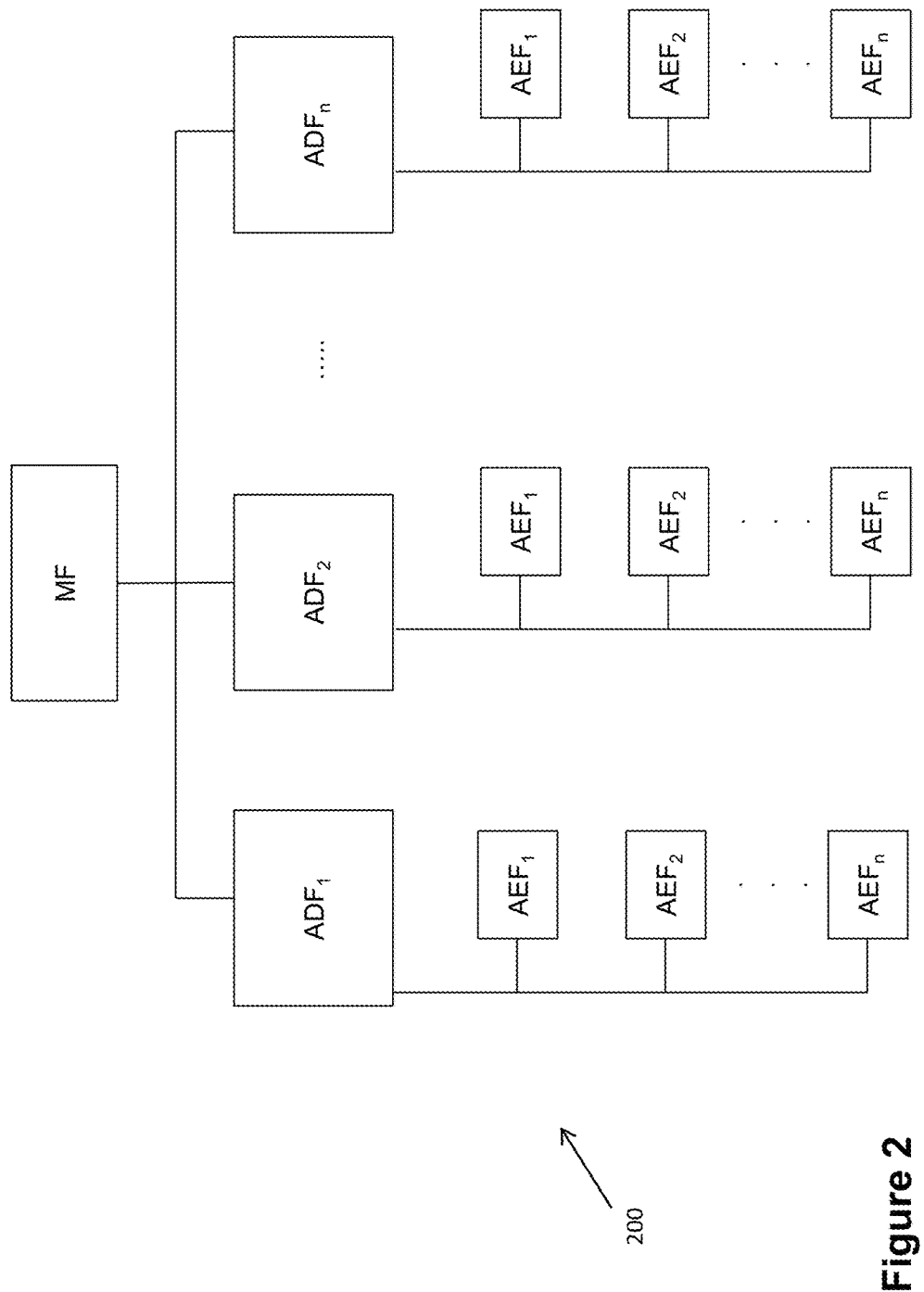
FIG. 2 shows a data organisation structure for the electronic chip of the carrier shown in FIG. 1.

In one implementation, the parameters are configured using protocols that are in compliance with EMV and RFID standards. These parameters may be configured to organise stored data or files in a tree structure 200 shown in FIG. 2.

The topmost file in the tree structure 200 is a Master File (MF). The MF has one or more Application Definition Files ($ADF_1, ADF_2, \ldots ADF_n$). Within each ADF are Application Elementary Files ($AEF_1, AEF_2, \ldots AEF_n$) that contain data.

Each issuer would be allocated an ADF, which can only be accessed by that issuer. Account numbers that belong to the issuer can then only be stored under the allocated ADF. One ADF can have multiple AEFs. Accordingly, data identifying each of the plurality of linked accounts is stored in the application elementary file ($AEF_1, AEF_2, \ldots AEF_n$) of the tree structure 200 implemented by the electronic chip 102.

As an illustration, an account number for a credit card and an account number for a debit card both belonging to a first issuer; and an account number for a credit card belonging to a second issuer may be stored as follows. Two AEFs ($AEF_1$, $AEF_2$) will be allocated (one for the credit card account number and the other for the debit card account number) under the ADF (for example $ADF_1$) allocated to the first issuer. One AEF ($AEF_1$) will be allocated for the credit card account number under the ADF (for example $ADF_2$) allocated to the second issuer. The electronic chip 102 will thus have data stored in three of its available AEFs. In addition to storing the above mentioned PAN data, each AEF may also store additional data, such as the expiry date of the carrier that is used to access the respective linked account (110, 120, 130). It will be appreciated that this carrier is one of the several payment cards that are combined into the carrier 104 and thus does not refer to the carrier 104.

Each of the first issuer and the second issuer may be responsible for programming the electronic chip 102 with its respective AEF data or a vendor may be commissioned to undertake this programming for both the first issuer and the second issuer. It is also possible for AEF data to be replaced, for example, if the holder wishes to terminate a particular stored account and replace it with data for an account number of a payment card that the holder already owns or a new account for which the holder has registered. Such replacement of AEF data may also be undertaken should the AEF store data of a linked account to which the carrier linked to that account has expired. The deletion and/or replacement of AEF data may be performed by the issuer of the respective account or the above commissioned vendor.

The parameters of the electronic chip 102 may also be used to store data of the expiry date of the stored linked account numbers (110, 120, 130).

In one implementation, the expiry date provided for the carrier 104 will be independent from each of the plurality of linked accounts (110, 120, 130). When the carrier 104 is about to expire, the holder may be notified in known manners (such as by email or a short message service notification) by, for example, the issuer of the carrier 104. Once the expiry date of the carrier 104 has past, this implementation disallows usage of all of the linked accounts (110, 120, 130), even if the expiry date assigned to the carrier that allows access to its designated linked accounts (110, 120, 130) has not yet expired (as mentioned above, the carrier 104 serves to combine several payment cards into a single payment card). Thus, the expiry date provided for the carrier 104 acts as a master expiry date. If usage of an expired carrier 104 is to continue, its expiry date has to be renewed or a new carrier 104 with a new expiry date has to be requested. However, renewal of the expiry date of the carrier 104 or issuance of a new carrier 104 will not impact the expiry date of each of the carriers that are combined inside the carrier 104.

For the sake of simplicity, it is to be understood that mention of expiry of each of the linked accounts (110, 120, 130) refers to the expiry date of the carrier used to access a respective linked account (110, 120, 130). Thus, each of the plurality of linked accounts (110, 120, 130) will have its own expiry date. When a linked account is about to expire, the holder may be notified in known manners (such as by email or a short message service notification) by the issuer of the linked account. If the customer extends the expiry date, for example by physically approaching the issuer, the respective issuer will update the data of the corresponding AEF file stored in the electronic chip 102. Otherwise, transactions made against the expired linked account will be blocked. Data for the expired account may be automatically deleted from the AEF in the electronic chip 102, for instance when the carrier 104 is read by a payment terminal. This causes the initialisation of a root program, stored in the electronic chip 102, to check for AEFs that store expired linked accounts and delete data for such AEFs. This root program may be configured to only undertake such an automatic deletion within a predetermined period (such as any one of 10, 20 or 30 days) after the expiry of the linked account, as determined by the issuer of the linked account. Accordingly, the holder to the carrier 104 has up to this predetermined period to renew the linked account to avoid this automatic deletion, whereby the expired linked account is not usable to perform transactions even though the electronic chip 102 still contains data of the expired linked account.

Returning to FIG. 1, a specific banking identification number can be allocated to the carrier 104, this specific banking identification number belonging to a reserved banking identification number (BIN) range. Detection of this specific BIN and determining that it belongs to the reserved BIN range causes a payment network to realise that it is processing an electronic chip 102 identifying a plurality of accounts (110, 120, 130) each linked to a respective issuer. When a terminal reads such an electronic chip 102, the terminal is then instructed to prompt for the selection of one of the plurality of linked accounts (110, 120, 130) against which the financial transaction is to be made. The BIN range to which the carrier 104 belongs is thus for identification purposes, i.e. to indicate to the payment network that its electronic chip 102 serves as a repository of accounts accessed by its respective payment card. This BIN range is not used to process payment, since payment is processed against one of the selected linked accounts (110, 120, 130).

At least one or more of the plurality of linked accounts (110, 120, 130) may be printed or embossed on the carrier 104, alongside with the name of the respective issuer of the linked account. Further, a letter "C" or "D" may be appended to the printed or embossed linked account, to identify whether the linked account is a credit account or a debit account respectively. To illustrate, the embodiment shown in FIG. 1 has two linked accounts (110, 120) printed on the carrier 104.

The issuer may also perform at least some personalization. Specifically, the issuer may perform magnetic personalization by encoding at least some generic data, issuer specific data and/or customer specific data on the magnetic strip 106.

Additionally, the issuer may perform further personalization of the electronic chip 102 by storing at least some generic data, issuer specific data and/or customer specific data therein. The electronic chip 102 may further be configured to support the Europay, MasterCard and Visa (EMV) standard.

Figure 3:
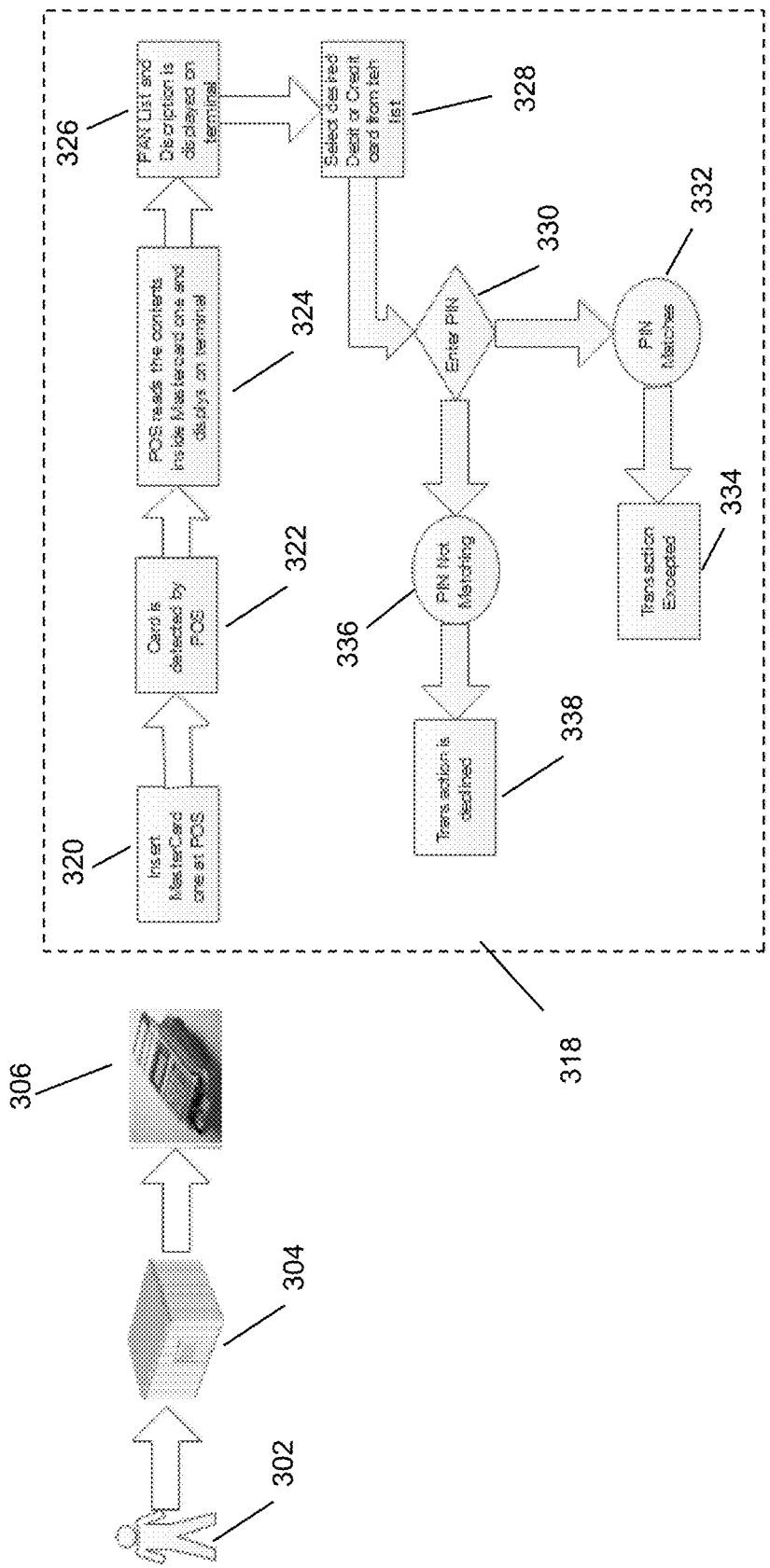
FIG. 3 shows a process where a financial transaction is performed using the carrier of FIG. 1.

FIG. 3 shows a process where a financial transaction is performed using the carrier 104 of FIG. 1.

A customer 302 with the carrier 104 of FIG. 1 patronises a merchant 304. The customer 302 then inserts the carrier 104 (in the contact configuration) or places the carrier 104 (in the contactless configuration) in proximity to a point-of-sale (POS) terminal 306 at the merchant 304. This insertion or proximal placement of the carrier 104 to the POS terminal 306 is represented using reference numeral 320 of the flow chart 318 of FIG. 3.

When the POS terminal 306 detects 322 that the payment chip 102 of the carrier 104 stores data identifying a plurality of accounts (110, 120, 130) each linked to a respective issuer and/or the plurality of linked accounts (110, 120, 130) belong to a reserved banking identification number (BIN) range, the POS terminal 306 reads 324 the content of the payment chip 102 and displays information of the cards that are stored in the payment chip 102. The information 326 that is displayed may include the primary account number (PAN) of each of the stored linked accounts (110, 120, 130) and details of the financial institution to which each belongs, such as the name of the issuer of the respective linked account. Each PAN may be appended with a letter to identify its account type, such as the letter "C" to indicate it is a credit card account or the letter "D" to indicate it is a debit card account. For example, the display of the POS terminal 306 may show: "C 1234567890987654 HDFC BANK" and "D 9876543120123456 Bank of America" on separate lines.

The customer 302 is then prompted 328 to select one of the linked accounts (110, 120, 130) displayed on the POS terminal 306 against which his or her transaction is to processed. As mentioned earlier, the linked accounts (110, 120, 130) may be from the same or different financial institutions, or may be credit or debit card accounts.

Once the customer selects one of the linked accounts (110, 120, 130) to carry out the current transaction, the POS terminal 306 will prompt 330 for an authorisation code to be entered, such as the PIN for the selected linked account (110, 120, 130). If the entered authorisation code matches 332, the transaction will be accepted and processed 334. If the entered authorisation code does not match 336, the transaction will be declined 338.

Figure 4:
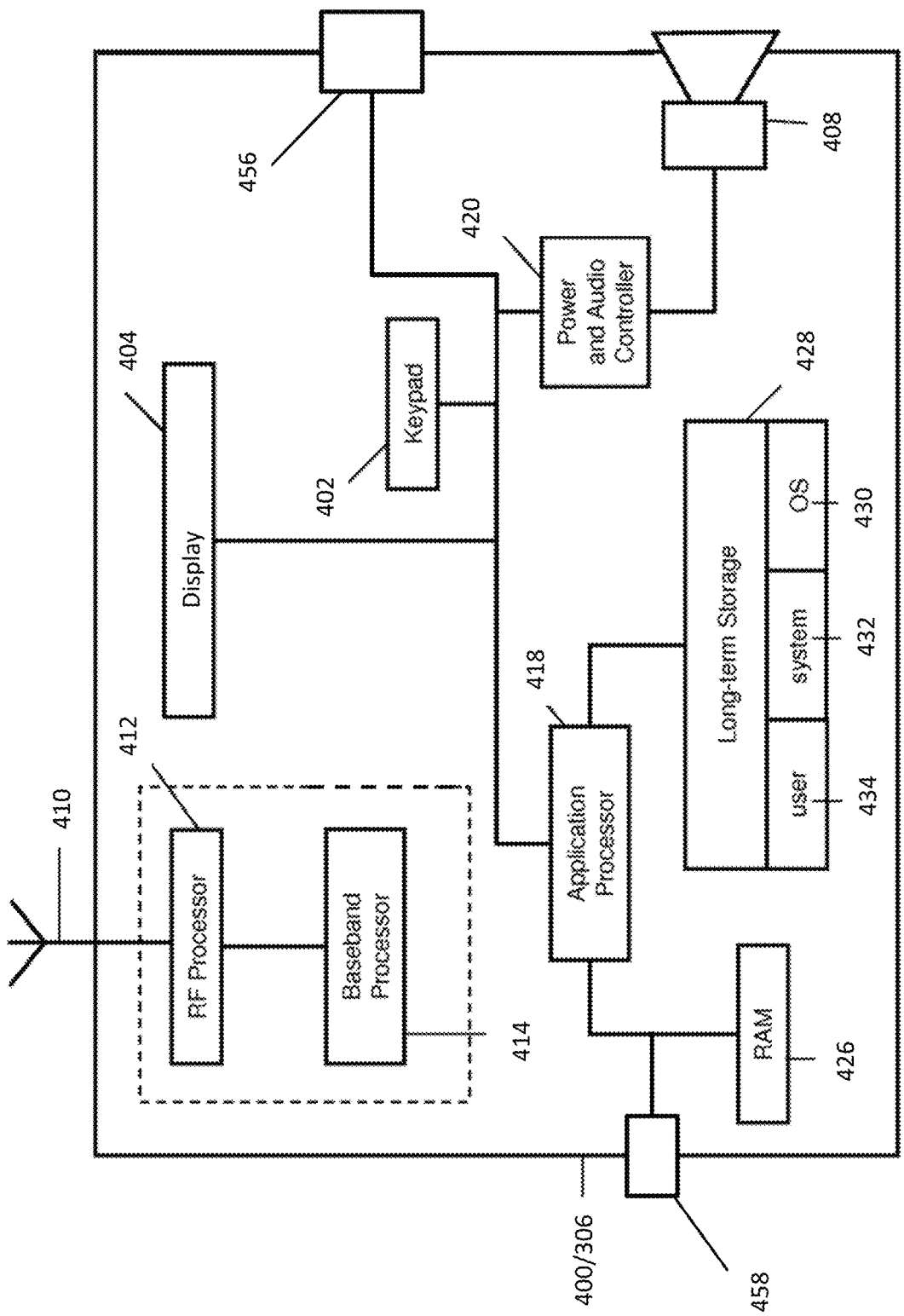
FIG. 4 is a schematic of a computing device that may be utilized to implement the POS terminal shown in FIG. 3

FIG. 4 is a schematic of a computing device 400 that may be utilized to implement the POS terminal 306 shown in FIG. 3.

The computing device 400 comprises a keypad 402, a display 404, a speaker 408 and an antenna 410. Communication hardware that is used to enable NFC communication with the payment chip 102 of the carrier 104 is represented by RF processor 412 which provides an RF signal to the antenna 410 for the transmission of data signals, and the receipt therefrom. Additionally provided is a baseband processor 414, which provides signals to and receives signals from the RF processor 412.

The keypad 402 and the display 404 are controlled by an application processor 418. The keypad 402 is used to select the linked account (110, 120, 130) used to process a transaction (confer reference numeral 328 of FIG. 3) and may also be used to enter the authorisation code (confer reference numeral 330 of FIG. 3). The display 404 is used to provide an indication of the status of the POS terminal 306, such as payment options available (like the list of linked accounts (110, 120, 130), confer reference numerals 324 and 326 of FIG. 3) when the POS terminal 306 detects that it is being used to receive electronic payment or that the POS terminal 306 is processing payment after a payment option is selected through the keypad 402. A power and audio controller 420 is provided to supply power to the RF processor 412 and the baseband processor 414, the application processor 418, and other hardware. The power and audio controller 420 also controls audio output via the speaker 408. The speaker 408 is used to provide sounds to indicate that a data transaction with the POS terminal 306 has been successfully completed.

In order for the application processor 418 to operate, various different types of memory are provided. Firstly, the computing device 400 includes Random Access Memory (RAM) 426 connected to the application processor 418 into which data and program code can be written and read from at will. Code placed anywhere in RAM 426 can be executed by the application processor 418 from the RAM 426. RAM 426 represents a volatile memory of the computing device 400.

Secondly, the computing device 400 is provided with a long-term storage 428 connected to the application processor 418. The long-term storage 428 comprises three partitions, an operating system (OS) partition 430, a system partition 432 and a user partition 434. The long-term storage 428 represents a non-volatile memory of the computing device 400.

In the present example, the OS partition 430 contains the firmware of the computing device 400 which includes an operating system. Other computer programs may also be stored on the long-term storage 428, such as application programs, and the like. In particular, application programs which are mandatory to the computing device 400 are typically stored in the system partition 432. The application programs stored on the system partition 432 would typically be those which are bundled with the computing device 400 by the device manufacturer when the computing device 400 is first sold. Application programs which are added to the computing device 400 by the user would usually be stored in the user partition 434.

The computing device 400 also comprises an electronic chip sensor 456. The electronic chip sensor 456, together with a suitable application, may be used to detect electronic chips 102 that are designed as described above with reference to FIG. 1 or an electronic chip that is present in conventional credit or debit cards. The electronic chip sensor 456 may have contact pads for reading electronic chips of contact configuration (e.g. those provided on an exposed surface of a payment card) or a wireless transceiver for reading electronic chips of contactless configuration (e.g. those provided within or embedded inside a payment card).

The POS terminal 306 is configured to initiate a financial transaction involving an issuer account. To utilise this communication link 216, the electronic chip sensor 456, the at least one processor (e.g. application processor 418) and the at least one memory (e.g. RAM 426, long-term storage 428)

with its computer program code are configured to cause the POS terminal 306 at least to detect, using the electronic chip sensor 456, an electronic chip having stored thereon data identifying a plurality of accounts each linked to a respective issuer, the electronic chip being part of a carrier. The at least one memory and the computer program code are further configured to, with the at least one processor, prompt, upon detection of the data identifying the plurality of linked accounts, for selection of one of the plurality of linked accounts before initiating the financial transaction.

The at least one memory and the computer program code are further configured to, with the at least one processor, cause the POS terminal 306 to determine whether a carrier on which the electronic chip is disposed belongs to a reserved banking identification number (BIN) range stored in a BIN database of the at least one memory. Upon selection of one of the plurality of linked accounts, the at least one memory and the computer program code are further configured to, with the at least one processor, cause the POS terminal 306 to transmit data packets intended for the issuer linked to the selected account. This transmission of the data packets may be through the antenna 410 or through a wired data communication port 458.

Figure 5:
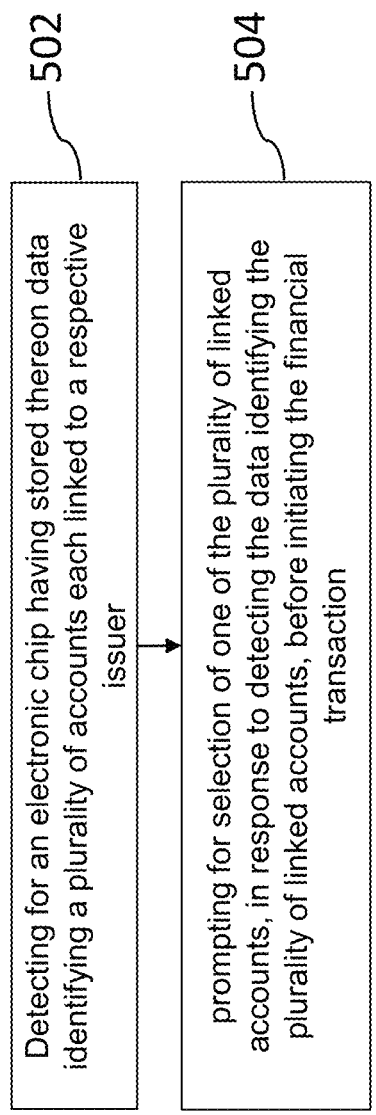
FIG. 5 shows a flowchart of a method for initiating the financial transaction shown in FIG. 3.

The POS terminal 306 of FIG. 4 may execute the method shown in FIG. 5 when used to facilitate a financial transaction involving an issuer account. This method comprises, at step 502, detecting for an electronic chip having stored thereon data identifying a plurality of accounts each linked to a respective issuer. The method further comprises, at step 504, prompting for selection of one of the plurality of linked accounts, in response to detecting the data identifying the plurality of linked accounts, before initiating the financial transaction.

The POS terminal 306 executes instructions which may be stored in any one or more of the RAM 426 or the long-term storage 428. These components 426 and 428 provide a non-transitory computer readable medium having stored thereon executable instructions for controlling the POS terminal 306 to perform steps comprising: a) detecting for an electronic chip having stored thereon data identifying a plurality of accounts each linked to a respective issuer; and b) prompting for selection of one of the plurality of linked accounts, in response to detecting the data identifying the plurality of linked accounts, before initiating the financial transaction.

It will be appreciated by a person skilled in the art that numerous variations and/or modifications may be made to the present invention as shown in the specific embodiments without departing from the scope of the appended claims as broadly described. The present embodiments are, therefore, to be considered in all respects to be illustrative and not restrictive.

The invention claimed is:

1. A carrier device comprising:
   an electronic chip having stored thereon data identifying a plurality of accounts each linked to a respective issuer and corresponding expiration dates for each of the plurality of accounts and an expiration date for the carrier device, wherein the expiration date for the carrier device is independent from the corresponding expiration dates for each of the plurality of accounts, and the electronic chip is configured to generate signals to instruct a terminal reading the electronic chip to prompt for selection of one of the plurality of linked accounts before initiating a financial transaction, the electronic chip having a contactless configuration and being disposed within the carrier device; and
   a contact interface disposed on a surface of the carrier device to access information stored on the electronic chip via contact reading;
   wherein the carrier device lacks an embedded power source, and the carrier device is to draw power from the terminal to enable the terminal to access the data from the electronic chip, and
   wherein in response to the carrier device being read by a payment terminal, the electronic chip is to initialize a root program, stored in the electronic chip, to determine whether any of the plurality of linked accounts are expired and, in response to identifying at least one expired account of the plurality of linked accounts, deleting data for the at least one expired account from the electronic chip.

2. The carrier of claim 1, wherein the plurality of accounts belong to the same issuer or different issuers.

3. The carrier of claim 1, wherein the electronic chip is at least one of a contact configuration whereby the electronic chip is provided on a surface of the carrier; or a contactless configuration whereby the electronic chip is provided within the carrier.

4. The carrier of claim 3, wherein the contact configuration is based on the ISO/IEC 7816 standard and the contactless configuration is based on the ISO/IEC 14443 standard.

5. The carrier of claim 1, wherein the electronic chip is configured to support the EMV standard.

6. The carrier of claim 1, wherein the electronic chip comprises an integrated circuit having the data identifying the plurality of linked accounts embedded or programmed therein.

7. The carrier of claim 1, wherein the data identifying each of the plurality of linked accounts is stored in an application elementary file of the electronic chip.

8. The carrier of claim 1, wherein the carrier is a payment card comprising any one or more of a credit card, a debit card or a prepaid card.

9. The carrier of claim 1, wherein the financial transaction comprises crediting or debiting the selected one of the plurality of linked accounts.

10. The carrier of claim 1, wherein the carrier is assigned a banking identification number belonging to a reserved banking identification number (BIN) range.

11. A terminal for initiating a financial transaction involving an issuer account, the terminal comprising:
    an electronic chip sensor;
    at least one processor; and
    at least one memory including computer program code stored thereon;
    the computer program code being executable by the at least one processor to cause the terminal to:
      detect, using the electronic chip sensor, an electronic chip of a carrier device which lacks an embedded power source, the electronic chip having stored thereon data identifying a plurality of accounts each linked to a respective issuer and corresponding expiration dates for each of the plurality of accounts and an expiration date for the carrier device, wherein the expiration date for the carrier device is independent from the corresponding expiration dates for each of the plurality of accounts, the electronic chip having a contactless configuration and being disposed within the carrier device; and prompt, upon detection of the data identifying the plurality of linked accounts, for selection of one of the plurality of linked accounts before initiating the financial transaction;

wherein the terminal is to supply power to access the data from the electronic chip via a contact interface disposed on a surface of the carrier device through contact reading;

wherein in response to the carrier device being read by the terminal, the terminal is to initiate initialization of a root program, stored in the electronic chip, to determine whether any of the plurality of linked accounts are expired and, in response to identifying at least one expired account of the plurality of linked accounts, deleting data for the at least one expired account from the electronic chip.

12. The terminal of claim 11, wherein the at least one memory and the computer program code are further configured to, with the at least one processor, cause the terminal to transmit data packets intended for the issuer linked to the selected account.

13. The terminal of claim 11, wherein the electronic chip sensor comprises contact pads or a wireless transceiver.

14. The terminal of claim 11, wherein the at least one memory and the computer program code are further configured to, with the at least one processor, cause the terminal to determine whether the carrier on which the electronic chip is disposed belongs to a reserved banking identification number (BIN) range stored in a BIN database of the at least one memory.

15. A method for facilitating a financial transaction involving an issuer account, the method being performed at a terminal used for the financial transaction, the method comprising:

detecting an electronic chip of a carrier device which lacks an embedded power source, the electronic chip having stored thereon data identifying a plurality of accounts each linked to a respective issuer and corresponding expiration dates for each of the plurality of accounts and an expiration date for the carrier device, wherein the expiration date for the carrier device is independent from the corresponding expiration dates for each of the plurality of accounts, the electronic chip having a contactless configuration and being disposed within the carrier device; and prompting for selection of one of the plurality of linked accounts, in response to detecting the data identifying the plurality of linked accounts, before initiating the financial transaction, wherein the terminal is to supply power to access the data from the electronic chip via a contact interface disposed on a surface of the carrier device through contact reading, and wherein in response to the carrier device being read by the terminal, the terminal is to initiate initialization of a root program, stored in the electronic chip, to determine whether any of the plurality of linked accounts are expired and, in response to identifying at least one expired account of the plurality of linked accounts, deleting data for the at least one expired account from the electronic chip.

16. A non-transitory computer readable medium having stored thereon executable instructions for controlling a terminal to perform steps comprising detecting for an electronic chip of a carrier device, the electronic chip having stored thereon data identifying a plurality of accounts each linked to a respective issuer and corresponding expiration dates for each of the plurality of accounts and an expiration date for the carrier device, wherein the expiration date for the carrier device is independent from the corresponding expiration dates for each of the plurality of accounts, the electronic chip having a contactless configuration and being disposed within the carrier device; and prompting for selection of one of the plurality of linked accounts, in response to detecting the data identifying the plurality of linked accounts, before initiating the financial transaction, and wherein in response to the carrier device being read by the terminal, the terminal is to initiate initialization of a root program, stored in the electronic chip, to determine whether any of the plurality of linked accounts are expired and, in response to identifying at least one expired account of the plurality of linked accounts, deleting data for the at least one expired account from the electronic chip.

\* \* \* \* \*